United States Patent
Kawashima et al.

(10) Patent No.: US 7,502,396 B2
(45) Date of Patent: Mar. 10, 2009

(54) SOLID-STATE LASER APPARATUS

(75) Inventors: Toshiyuki Kawashima, Hamamatsu (JP); Tadashi Kanabe, Takarazuka (JP); Sadao Nakai, 6-45, Kitakasuga-oka 3-chrome, Ibaraki-shi, Osaka 567-0048 (JP); Hirofumi Kan, Hamamatsu (JP)

(73) Assignees: Hamamatsu Photonics K.K., Hamamatsu-shi, Shizuoka (JP); Sadao Nakai, Ibaraki-shi, Osaka (JP)

( * ) Notice: Subject to any disclaimer, the term of this patent is extended or adjusted under 35 U.S.C. 154(b) by 0 days.

(21) Appl. No.: 10/569,465

(22) PCT Filed: Aug. 23, 2004

(86) PCT No.: PCT/JP2004/012074
§ 371 (c)(1),
(2), (4) Date: Dec. 1, 2006

(87) PCT Pub. No.: WO2005/022707
PCT Pub. Date: Mar. 10, 2005

(65) Prior Publication Data
US 2007/0297470 A1  Dec. 27, 2007

(30) Foreign Application Priority Data
Aug. 28, 2003  (JP)  ............... 2003-305211

(51) Int. Cl.
*H01S 3/04* (2006.01)
(52) U.S. Cl. .......................................... 372/34; 372/35
(58) Field of Classification Search ................... 372/35, 372/34
See application file for complete search history.

(56) References Cited

FOREIGN PATENT DOCUMENTS
EP       0 897 206       2/1999

(Continued)

OTHER PUBLICATIONS

"Analysis of Amplification for a Diode-Pumped Nd: Glass Zig-Zag Slab Laser," 23rd Annual Meeting of The Laser Society of Japan, Digest Technical Papers, Jan. 30-31, 2003, pp. 51 (w/partial translation).

(Continued)

*Primary Examiner*—Dung T Nguyen
(74) *Attorney, Agent, or Firm*—Drinker Biddle & Reath LLP

(57) ABSTRACT

A solid-state laser apparatus which can improve its durability is provide.

In the solid-state laser apparatus 1, a main pipe 11 for circulating a coolant through a solid-state laser medium 3 is provided with a heat exchanger 14, whereby the laser medium 3 is prevented from raising its temperature. When the coolant becomes acidic or alkaline, a controller 24 controls a flow regulating valve 23, so as to increase the flow rate of the coolant flowing into a bypass pipe 21 provided with a deionizing filter 22, whereby the acidity or alkalinity of the coolant can be weakened. This can prevent the coolant from deteriorating a predetermined part of the laser apparatus 3, and thus can improve the durability of the solid-state laser apparatus 1. Also, since the bypass pipe 21 connected in parallel to a part of the main pipe 11 is provided with the deionizing filter 22, the flow rate of the coolant circulating through the main pipe 11 can be restrained from decreasing, and the cooling efficiency of the laser medium 3 can be prevented from lowering.

5 Claims, 2 Drawing Sheets

FOREIGN PATENT DOCUMENTS

| | | | |
|---|---|---|---|
| JP | 63-251779 | | 10/1988 |
| JP | 1-268080 | | 10/1989 |
| JP | 03-22579 | | 1/1991 |
| JP | 03-192798 | * | 8/1991 |
| JP | 05-220168 | | 8/1993 |
| JP | 6-045667 | | 2/1994 |
| JP | 06-125916 | * | 5/1994 |
| JP | 6-216438 | | 8/1994 |
| JP | 7-283466 | | 10/1995 |
| JP | 08-330648 | | 12/1996 |
| JP | 10-339537 | | 12/1998 |
| JP | 11-340551 | | 12/1999 |
| JP | 2000-12926 | | 1/2000 |
| JP | 2000-252557 | | 9/2000 |
| JP | 2001-015844 | | 1/2001 |

OTHER PUBLICATIONS

"360-W Average Power Operation With A Single-Stage Diode-Pumped Nd:YAG Amplifier at a 1-kHz Repetition Rate," *Optics Letters*, vol. 28, No. 18, Sep. 15, 2003, pp. 1671-1673.

"Design and Testing of a Large-Aperture, High-Grain, Brewster's Angle Zigzag Nd: Glass Slab Amplifier," *Applied Optics*, vol. 36, No. 24, Aug. 20, 1997, pp. 5827-5838.

\* cited by examiner

SOLID-STATE LASER APPARATUS

TECHNICAL FIELD

The present invention relates to a laser apparatus which cools a solid-state laser medium with a coolant.

BACKGROUND ART

A conventional example of this kind of techniques is a zigzag-slab solid-state laser apparatus disclosed in Non-patent Document 1. This solid-state laser apparatus circulates a coolant through a laser medium, so as to prevent the laser medium from raising its temperature. This is done in order to prevent the pumping light generated by a semiconductor laser from raising the temperature of the laser medium and causing a thermal lens effect and the like.

Non-patent Document 1: "Amplification Analysis of High-Output LD-Pumped Zigzag-Slab Nd Glass Laser", Digest of Technical Papers, the 23rd Annual Meeting of the Laser Society of Japan, p. 51

DISCLOSURE OF THE INVENTION

Problem to be Solved by the Invention

However, even when neutral deionized water is used as a coolant in a solid-state laser apparatus such as the one mentioned above, the coolant may contain carbon dioxide gas in its circulating process or impurity ions generated from piping and the like, thereby becoming acidic or alkaline. When the coolant becomes acidic or alkaline, a predetermined part of the solid-state laser apparatus may deteriorate, thereby damaging the durability of the solid-state laser apparatus. When the coolant is brought into direct contact with the laser medium in particular, the quality of emitted laser light may deteriorate in a short period since surfaces of the laser medium are likely to corrode.

In view of such circumstances, it is an object of the present invention to provide a solid-state laser apparatus which can improve its durability.

Means for Solving Problem

For achieving the above-mentioned object, the solid-state laser apparatus in accordance with the present invention is a solid-state laser apparatus adapted to cool a solid-state laser medium with a coolant; the apparatus comprising a main pipe for circulating the coolant through the solid-state laser medium; cooling means, provided in the main pipe, for cooling the coolant; a bypass pipe connected in parallel to at least a part of the main pipe; neutralizing means, provided in the bypass pipe, for weakening an acidity or alkalinity of the coolant; flow regulating means, provided upstream of the neutralizing means in the bypass pipe, for regulating a flow rate of the coolant flowing into the bypass pipe; and control means for controlling the flow regulating means such as to increase the flow rate of the coolant flowing into the bypass pipe when the coolant is acidic or alkaline.

Since the main pipe for circulating the coolant through the solid-state laser medium is provided with cooling means for cooling the coolant, this solid-state laser apparatus can prevent the solid-state laser medium from raising its temperature. When the coolant becomes acidic or alkaline, the control means controls the flow regulating means, so as to increase the flow rate of the coolant flowing into the bypass pipe provided with the neutralizing means, whereby the acidity or alkalinity of the coolant can be weakened. This can prevent an acidic or alkaline coolant from deteriorating a predetermined part of the solid-state laser apparatus, and thus can improve the durability of the solid-state laser apparatus. Also, since the bypass pipe connected in parallel to at least a part of the main pipe is provided with the neutralizing means, the flow rate of the coolant circulating through the main pipe can be restrained from decreasing, whereby the cooling efficiency of the solid-state laser medium can be prevented from lowering.

Preferably, the control means increases the flow rate of the coolant flowing into the bypass pipe as the acidity or alkalinity of the coolant is stronger. This can rapidly weaken the acidity or alkalinity of the coolant.

Preferably, the coolant comes into direct contact with the solid-state laser medium. This can improve the cooling efficiency of the solid-state laser apparatus. In this case, there is a fear of the solid-state laser medium being likely to be corroded by the acidic or alkaline coolant. However, the solid-state laser apparatus in accordance with the present invention can weaken the acidity or alkalinity of the coolant as mentioned above, and thus can prevent the coolant from corroding the laser medium surface. Therefore, the durability of the laser medium itself can be improved, while the quality of emitted laser light can be maintained favorably for a long period.

Preferably, the main pipe is provided with a pump for circulating the coolant, whereas the bypass pipe is connected in parallel to at least a part of the main pipe between the solid-state laser medium and an intake of the pump. This allows the coolant discharged from the pump to reach the solid-state laser medium without decreasing its flow rate, and thus can more reliably prevent the cooling efficiency of the solid-state laser medium from lowering.

Preferably, the main pipe is provided with a tank for storing the coolant, whereas the control means detects the acidity or alkalinity of the coolant stored in the tank. When the acidity or alkalinity of the coolant once stored in the tank is detected, a highly accurate result of detection can be obtained.

Preferably, the bypass pipe is connected in parallel to at least a part of the main pipe between the solid-state laser medium and an inlet of the tank. In this case, the coolant having lowered its acidity or alkalinity through the bypass pipe (i.e., through the neutralizing means) and the coolant having traveled the main pipe mingle with each other in the tank, whereby the acidity or alkalinity of the coolant reaching the solid-state laser medium can be detected with a higher accuracy.

EFFECT OF THE INVENTION

The present invention can improve the durability of the solid-state laser apparatus.

EXPLANATIONS OF NUMERALS

1 . . . solid-state laser apparatus; 3 . . . solid-state laser medium; 11 . . . main pipe; 12 . . . tank; 12$b$ . . . inlet; 13 . . . pump; 13$a$ . . . intake; 14 . . . heat exchanger (cooling means); 21 . . . bypass pipe; 22 . . . deionizing filter (neutralizing means); 23 . . . flow regulating valve (flow regulating means); 24 . . . controller (control means).

BEST MODES FOR CARRYING OUT THE INVENTION

In the following, preferred embodiments of the solid-state laser apparatus in accordance with the present invention will be explained in detail with reference to the drawings.

Figure 1:
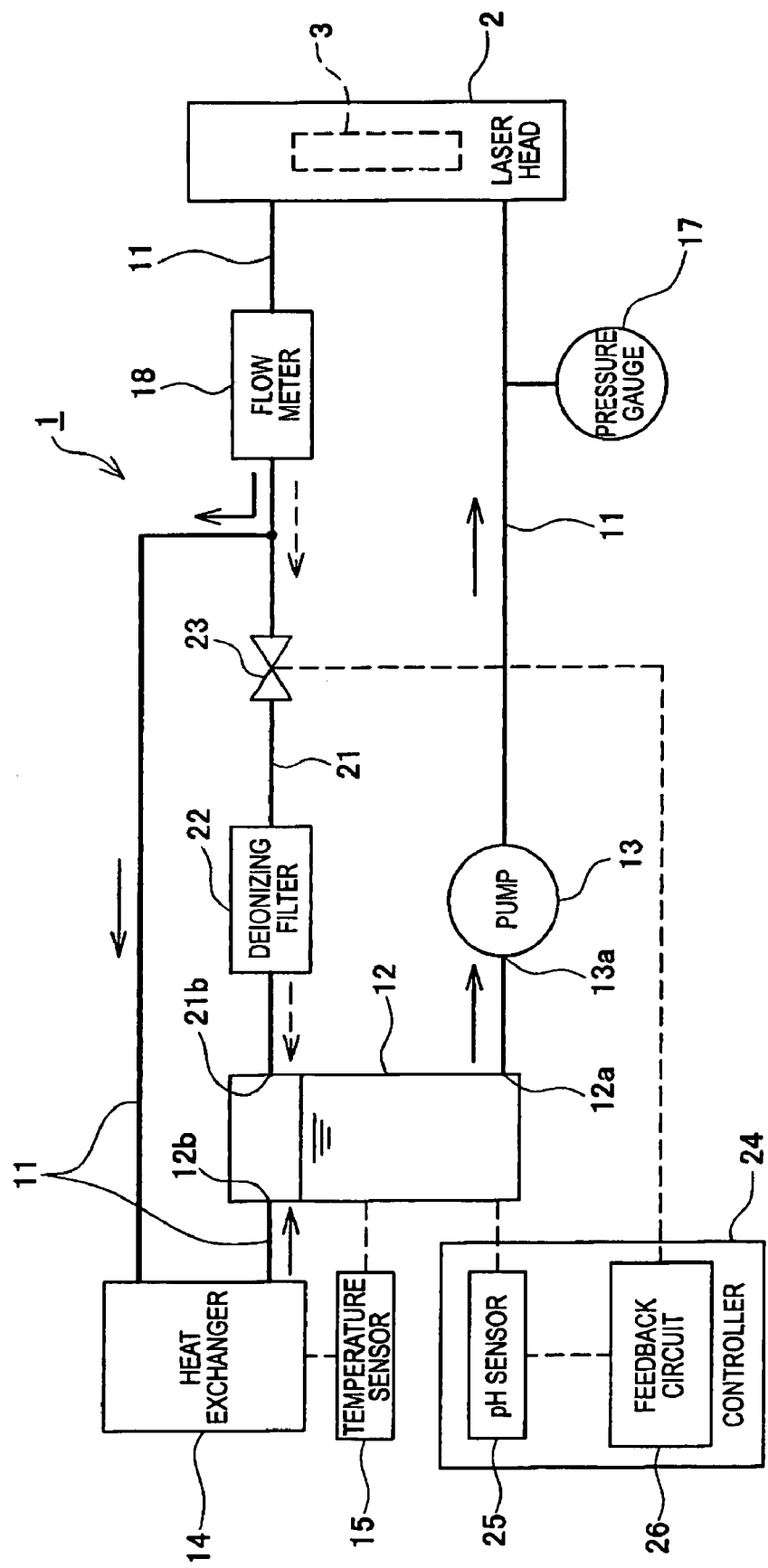
FIG. 1 is a diagram of an embodiment of the solid-state laser apparatus in accordance with the present invention.

As shown in FIG. 1, the solid-state laser apparatus 1 is one in which a solid-state laser medium 3 of a slab type (having a rectangular plate form here) accommodated in a laser head 2 is cooled with a coolant. In the laser medium 3 in the laser head 2, end faces opposing each other in its longitudinal direction are an entrance face 3a and an exit face 3b for light L to be amplified, whereas wider end faces orthogonal to the entrance face 3a and exit face 3b are reflecting surfaces 3c, 3d for the light L to be amplified. Here, the laser medium 3 is one in which phosphate-based glass for laser as a matrix is doped with neodymium as a laser active species, though not restricted thereto. For example, silica-based glass for laser or crystal materials such as YAG, YLF, $YVO_4$, S-FAP, sapphire, alexandrite, forsterite, and garnet may be used as the matrix. As the laser active species, rare-earth elements such as Yb, Er, Ho, and Tm or transition elements such as Cr and Ti may be used.

Figure 2:
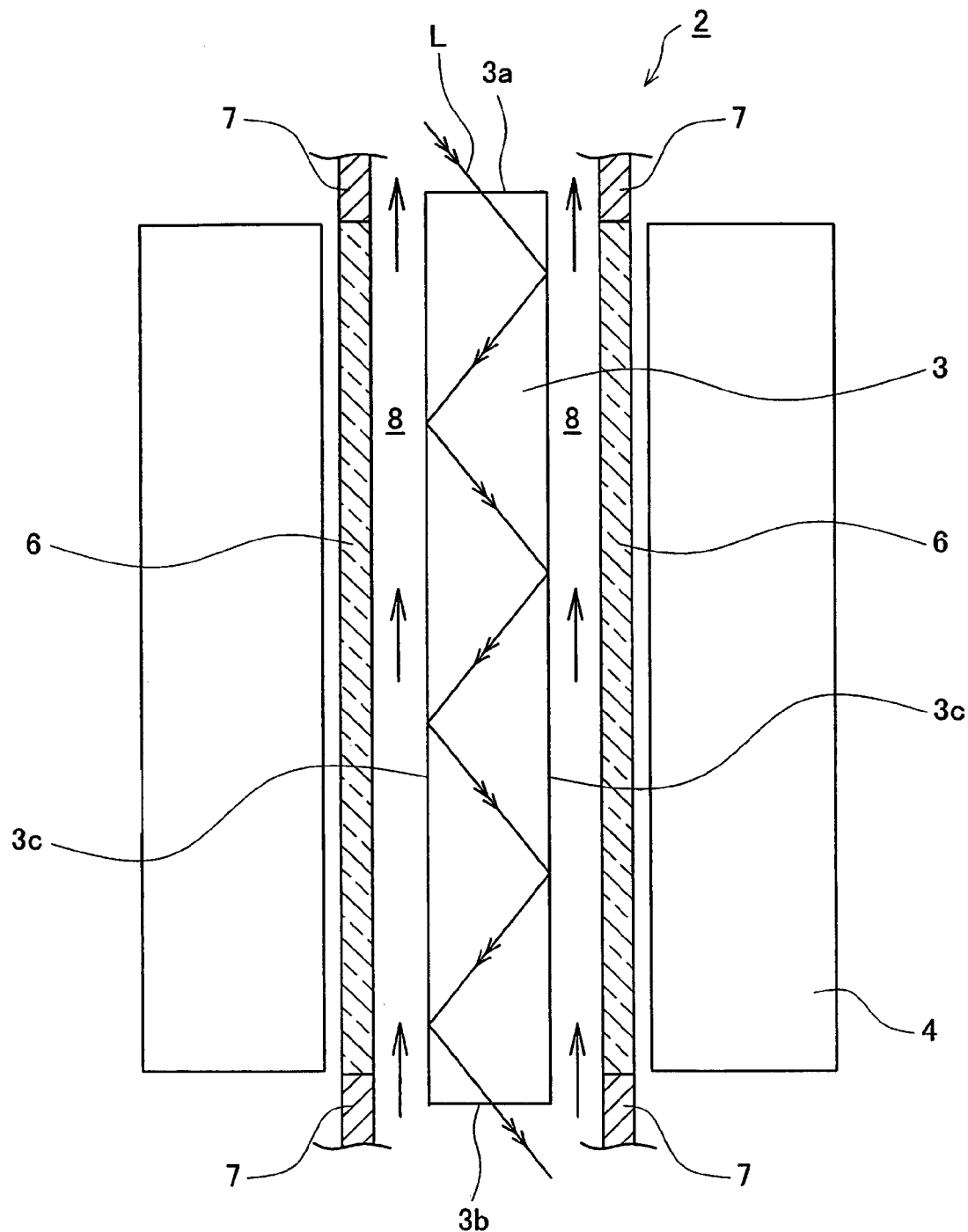
FIG. 2 is a diagram of the laser head in the solid-state laser apparatus of FIG. 1.

A semiconductor laser 4 for irradiating the laser medium 3 with pumping light is arranged at a position opposing each reflecting surface 3c, whereas a window member 6 which transmits the pumping light therethrough is placed between the reflecting surface 3c and semiconductor laser 4 opposing each other. Each window member 6 is watertightly secured to a holding part 7 which is a part of a housing (not depicted) of the laser head 2, whereas a flow path 8 through which the coolant flows as indicated by solid arrows in FIG. 2 is formed between the watertightly secured window member 6 and holding part 7 and the reflecting surface 3c of the laser medium 3.

In thus configured laser head 2, the light L to be amplified incident on the laser medium 3 from the entrance face 3a is repeatedly reflected by the reflecting surfaces 3c, 3c opposing each other, so as to propagate through the laser medium 3 in a zigzag fashion while being amplified, and exits from the exit face 3b. Though the pumping light generated by the semiconductor laser 4 heats the laser medium 3, the coolant comes into direct contact with the reflecting surfaces 3c of the laser medium 3, and thus can efficiently deprive the laser medium 3 of heat. This can prevent the laser medium 3 from raising its temperature and causing a thermal lens effect and the like.

As shown in FIG. 1, the solid-state laser apparatus 1 further comprises a main pipe 11 laid out in a ring form so as to circulate the coolant through the laser medium 3 by way of the above-mentioned flow path 8 within the laser head 2. Namely, the flow path 8 constitutes a part of the main pipe 11. A tank 12 for storing the coolant is provided in the middle of the main pipe 11, whereas a pump 13 for discharging the coolant from within the tank 12 toward the laser medium 2 is connected to the main pipe 11 between the outlet 12a of the tank 12 and the laser medium 3. The pump 13 causes the coolant within the tank 12 to circulate through the laser medium 3 by way of the main pipe 11 as indicated by solid arrows in FIG. 1.

A heat exchanger (cooling means) 14 for cooling the coolant is connected to the main pipe 11 between the laser medium 3 and the inlet 12b of the tank 12. The heat exchanger 14 cools the coolant such that a temperature within a predetermined temperature range is attained according to a result of measurement of a temperature sensor 15 which monitors the temperature of the coolant within the tank 12. Therefore, the coolant having raised its temperature by depriving the laser medium 3 of heat in the laser head 2 is cooled by the heat exchanger 14 to a temperature within the predetermined temperature range, and then is returned into the tank 12. In addition, the main pipe 11 is provided with a pressure gauge 17 for monitoring the pressure of the coolant flowing into the laser head 2, and a flow meter 18 for monitoring the flow rate of the coolant flowing out of the laser head 2. According to results of their measurement, when the pressure is outside of a predetermined pressure range or the flow rate is outside of a predetermined flow rate range, an alarm is rung as a warning or an interlock works.

Further, a bypass pipe 21 is connected in parallel to a part of the main pipe 11 between the laser medium 3 and the inlet 12b of the tank 12. More specifically, the upstream end 21a of the bypass pipe 21 is connected to the main pipe 11 between the flow meter 18 and the heat exchanger 14, whereas the downstream end 21b of the bypass pipe 21 is connected to the tank 12. A deionizing filter (neutralizing means) 22 made of an ion exchange resin which turns an acidic or alkaline coolant into a substantially neutral state is connected to the bypass pipe 21. A flow regulating valve (flow regulating means) 23 for regulating the flow rate of the coolant flowing into the bypass pipe 21 as indicated by broken arrows in FIG. 1 is connected to the upstream side of the deionizing filter 22 on the bypass pipe 21.

The flow regulating valve 23 is controlled by a controller (control means) 24 such as to increase the flow rate of the coolant flowing into the bypass pipe 21 when the coolant is acidic or alkaline. More specifically, the controller 24 includes a pH sensor 25 for monitoring the hydrogen ion exponent (pH value) of the coolant within the tank 12, and a feedback circuit 26 for regulating the opening of the flow regulating valve 23. The feedback circuit 26 causes the flow regulating valve 23 to open when the pH value of the coolant within the tank 12 is outside of a predetermined pH range (e.g., a range centered at pH 7) (i.e., when the acidity or alkalinity of the coolant within the tank 12 exceeds a predetermined strength), and makes the opening of the flow regulating valve 23 greater as the acidity or alkalinity of the coolant is stronger.

Thus, the pH sensor 25 of the controller 24 detects the acidity or alkalinity of the coolant once stored in the tank 12. Also, in the tank 12, the coolant having become substantially neutral through the bypass pipe 21 (i.e., through the deionizing filter 22) and the coolant having traveled the main pipe 11 mingle with each other. Therefore, the pH sensor 25 can detect with a very high accuracy the pH value of the coolant reaching the laser medium 3.

Here, the pH sensor 25 is one utilizing an ion-sensitive field-effect transistor (ISFET) employing a thin film of $SiO_2/Si_3N_4$ as a sensitive part, generates an interfacial potential corresponding to the hydrogen ion amount in the coolant by bringing the coolant into contact with an $Si_3N_4$ film on its gate, and takes out this potential as an output voltage. Namely, the pH sensor 25 can measure the pH dependence of the coolant. However, the pH sensor 25 is not restricted to the above, whereas those measuring the pH value by detecting an ion amount with a glass electrode having KCl or Ag/AgCl deposited thereon and those calculating the pH value by measuring the electric conductivity of the coolant may also be used, for example.

While the pump 13 causes the coolant in the tank 12 to circulate through the laser medium 3 by way of the main pipe 11 in thus configured solid-state laser apparatus 1, the coolant is cooled by the heat exchanger 14 so as to attain a temperature within a predetermined temperature range, and thus can prevent the laser medium 3 from raising its temperature.

Here, the pH value of the coolant in the tank 12 may fall out of a predetermined pH range because of various reasons, e.g., because the coolant contains gases such as carbon dioxide, oxygen, and nitrogen stored in the upper part within the tank 12 and because the coolant contains impurity ions generated by the laser head 2, the main pipe 11, and the like. In this case, the controller 24 opens the flow regulating valve 23, so that the coolant flows into the bypass pipe 21 having the deionizing filter 22 connected thereto, whereby the coolant becomes substantially neutral and returns into the tank 12, which weakens the acidity or alkalinity of the coolant. Consequently, the acidic or alkaline coolant can be prevented from deteriorating a predetermined part of the solid-state laser apparatus 1, whereby the durability of the solid-state laser apparatus 1 can be improved.

Here, the opening of the flow regulating valve 24 is made greater as the acidity or alkalinity of the coolant is stronger, whereby the flow rate of the coolant flowing into the bypass pipe 21 increases as the acidity or alkalinity of the coolant is stronger. Therefore, the acidity or alkalinity of the coolant can be weakened rapidly. The flow regulating valve 21 may be opened to a predetermined extent from when the solid-state laser apparatus 1 begins operating, so as to allow a predetermined amount of the coolant to pass through the deionizing filter 22, and the flow rate of the coolant flowing into the bypass pipe 21 may be increased when the acidity or alkalinity of the coolant becomes stronger.

While the coolant comes into direct contact with the solid-state laser medium 3 as mentioned above, the solid-state laser apparatus 1 can weaken the acidity or alkalinity of the coolant, and thus can prevent the coolant from corroding the surfaces (i.e., reflecting surfaces 3c) of the laser medium 3. As a consequence, the quality of emitted laser light can be maintained favorably for a long period by preventing the light L to be amplified from being scattered by the reflecting surfaces 3c and so forth, while the durability of the laser medium 3 itself can be improved.

Since the bypass pipe 21 connected in parallel to a part of the main pipe 11 is provided with the deionizing filter 22, the flow rate of the coolant circulating through the main pipe 11 can be restrained from decreasing, whereby the cooling efficiency of the solid-state laser medium 3 can be prevented from lowering. Also, since the bypass pipe 21 is connected in parallel to a part of the main pipe 11 between the laser medium 3 and the inlet 12b of the tank 12, i.e., between the laser medium 3 and the intake 13a of the pump 13, the coolant discharged from the pump 13 reaches the laser medium 3 without lowering its flow rate. Therefore, the cooling efficiency of the laser medium 3 can more reliably be prevented from decreasing.

The present invention is not limited to the embodiment mentioned above. For example, though the deionizing filter 22 acting as the neutralizing means is one which turns the acidic or alkaline coolant into a substantially neutral state, those which weaken the acidity or alkalinity of the coolant (make the pH value approach 7) can also be employed.

INDUSTRIAL APPLICABILITY

As explained in the foregoing, the present invention can improve the durability of the solid-state laser apparatus.

The invention claimed is:

1. A solid-state laser apparatus adapted to cool a solid-state laser medium with a coolant, the apparatus comprising:
    a main pipe for circulating the coolant through the solid-state laser medium;
    cooling means, provided in the main pipe, for cooling the coolant;
    a bypass pipe connected in parallel to at least a part of the main pipe;
    neutralizing means, provided in the bypass pipe, for weakening an acidity or alkalinity of the coolant;
    flow regulating means, provided upstream of the neutralizing means in the bypass pipe, for regulating a flow rate of the coolant flowing into the bypass pipe; and
    control means for controlling the flow regulating means such as to increase the flow rate of the coolant flowing into the bypass pipe when the coolant is acidic or alkaline,
    wherein the main pipe is provided with a pump for circulating the coolant,
    wherein the bypass pipe is connected in parallel to at least a part of the main pipe between the solid-state laser medium and an intake of the pump, and
    wherein an upstream end and a downstream end of the bypass pipe are connected to the main pipe between the solid-state laser medium and an intake of the pump.

2. A solid-state laser apparatus according to claim 1, wherein the main pipe is provided with a tank for storing the coolant at the upstream of the pump,
    wherein the bypass pipe is connected in parallel to at least a part of the main pipe between the solid-state laser medium and an inlet of the tank, and
    wherein the upstream end and the downstream end of the bypass pipe are connected to the main pipe between the solid-state laser medium and the inlet of the tank.

3. A solid-state laser apparatus according to claim 1, wherein the main pipe is provided with a tank for storing the coolant, and
    wherein the control means detects the acidity or alkalinity of the coolant stored in the tank.

4. A solid-state laser apparatus according to claim 1, wherein the control means increases the flow rate of the coolant flowing into the bypass pipe as the acidity or alkalinity of the coolant is stronger.

5. A solid-state laser apparatus according to claim 1, wherein the coolant comes into direct contact with the solid-state laser medium.

* * * * *